United States Patent [19]

Dobson

[11] 3,801,042

[45] Apr. 2, 1974

[54] LATCH FOR TAPE CASSETTE REELS

[76] Inventor: George Dobson, 510 Upton St., Redwood City, Calif. 94062

[22] Filed: Mar. 30, 1972

[21] Appl. No.: 239,571

[52] U.S. Cl. .................. 242/199, 242/71.2, 242/198

[51] Int. Cl. ............................................ G11b 23/10

[58] Field of Search ........... 242/198, 199, 200, 197, 242/194, 71.1, 71.2; 179/100.2 Z, 100.2 ZA; 274/4 B, 4 C, 11 B, 11 C; 352/72, 78

[56] References Cited

UNITED STATES PATENTS

| | | | |
|---|---|---|---|
| 2,401,632 | 6/1946 | Greenleaf | 242/198 UX |
| 2,484,552 | 10/1949 | Camras | 179/100.2 Z |

FOREIGN PATENTS OR APPLICATIONS

| | | | |
|---|---|---|---|
| 457,007 | 11/1936 | Great Britain | 242/71.2 |

*Primary Examiner*—George F. Mautz
*Attorney, Agent, or Firm*—Julian Caplan

[57] ABSTRACT

Conventional tape casettes have tape wound about two reels which, when the casette is removed from its storage box or from the tape reels or transcribing machine, are free to unwind with possible consequent damage to the tape. A latch for one, or both, reels is provided which slides in a slot in the top of the casette, the latch and casette top having cam surfaces which cause an inward projection on the latch to frictionally engage the reel or the desk-like shield in which the shield is enclosed. Thus unintentional unwinding of the tape is prevented.

6 Claims, 6 Drawing Figures

LATCH FOR TAPE CASSETTE REELS

This invention relates to a new and improved latch for tape casette reels. More particularly, the invention relates to a casette latch which prevents magnetic recording tape reels from unwinding between uses.

A principal feature of the invention is the fact that it is unnecessary to store the casettes in boxes in order to prevent unwinding of the tape. The fact that the casettes need no longer be stored in boxes makes it possible to provide racks for casettes for storage in a readily accessible manner.

Another feature of the invention is the fact that very little modification of the casette structure is required in order to incorporate the latch.

Still another feature of the invention is the fact that the latch does not project a substantial distance above the surface of the casette and hence does not interfere with the performance of the recording or transcribing machine.

Another feature of the invention is the fact that the latch engages the reel spindle rather than the tape or the thin protective shield for the tape. Hence the danger of damage to the tape when the latch is engaged is minimal.

Other objects of the present invention will become apparent upon reading the following specification and referring to the accompanying drawings inhich similar characters of reference represent corresponding parts in each of the several views.

Figure 1:
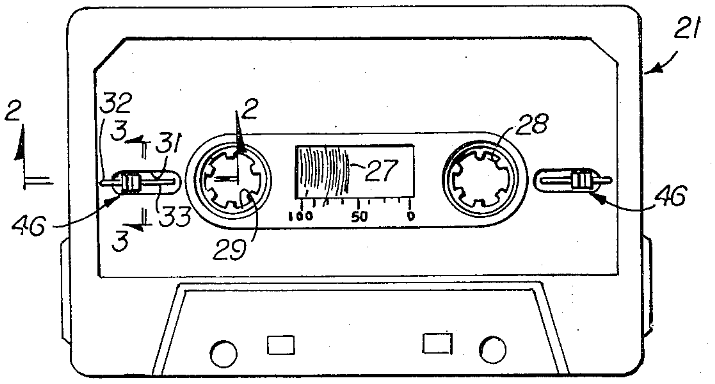
FIG. 1 is a top plan view of one form of cassette in which the present invention is incorporated.
Figure 3:
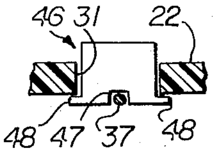
FIG. 3 is a transverse sectional view taken substantially along the line of 3—3 of FIG. 1.
Figure 2:
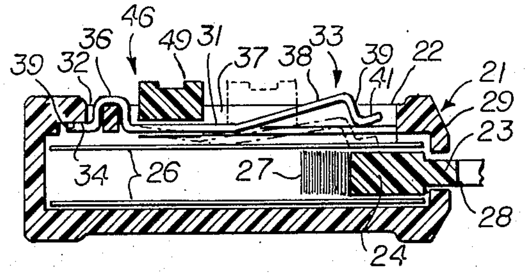
FIG. 2 is a fragmentary vertical sectional view in enlarged scale taken substantially along the line 2—2 of FIG. 1.

Directing attention first to the modification of FIGS. 1–3, a conventional magnetic tape recording cassette 21 is illustrated. Such a cassette has a top cover 22 formed with viewing windows and apertures for purposes hereinafter described. Disposed within the hollow cassette 21 is a pair of reels 23 having enlarged thickness rims 2 and further having parallel top and bottom thin shields 26. The magnetic sound tape 27 is wound around the outside of the rim 24 between the shields 26. Apertures 28 are formed in the cover 22 to provide access to the spline 29 on the reel 23 for winding and unwinding the reels in the well known mechanism in the recording and transcribing machines. In the foregoing respects, the cassette 21 is conventional. Usually cases, or boxes, (not shown) are provided to contain the cassette 21, and these may contain projections which engage the spline 28 to prevent the reels from winding and unwinding and hence keep the tape 27 tight. However, where the boxes are not used either because of the user's preference to discard the box rather than perform the onerous task of storing the cassette in a box after each use or while the cassette is being transferred to the box or to the machine there is always the possibility that the tape 27 will unwind and snarl. A principal purpose of the present invention is to prevent unwinding of the tape as hereinafter explained.

Slot 31 is formed in cover 22 extending from an outer limit spaced from the outside edge of the cassette to a position directly over the path of rim 24. A small hole 32 is formed outwardly of the outer end of slot 31. Preferably, there are two slots 31 formed in the cassette, one for each reel, but in some instances it will be found that a single slot and a single latch mechanism is sufficient. A round cross-section wire spring 33 is used. Such spring has an outer tail 34 which is inserted through hole 32 and fits into an undercut 35 on the inside of cover 22, the recess 35 functioning as a locating mechanism for the spring 33. Outwardly of tail 34, the spring is formed with an upward U-bend 36 which extends up over the material in cover 22 which remains the end of slot 31 and hole 32. The inner end of U-bend 36 is located extending into slot 31 at the outer margin thereof. Inwardly of bend 36 the spring 33 is formed in an elongated middle stretch 37 which extends about half-way of the radius of the reel 23 and then joins an upwardly-inwardly slanted ramp 38 which in the relaxed position of the spring 33 extends up to the top surface of cover 22 (see solid lines in FIG. 2). The inner end of the ramp 38 terminates in a downwardly right-angle bend 39 which has an inwardly directed right-angle foot 41. The foot 41 engages the rim 24 in latched position.

Latch button 46 is formed of a plastic material such as teflon or other suitable material. The button 46 has a groove 37 on its underside which receives spring 33. The outer edges of button 46 are formed in outwardly directed feet 48 which fit under cover 22 at the margins of slot 3 and hence prevent the button 46 from escaping from the slot. To facilitate movement of the button 46, finger slits 49 may be formed in the exposed top surface thereof.

In use, assuming that the device is unlatched and is in the solid line position of FIG. 2, when it is necessary to latch the reel 23 the user engages the latch button 46 making use of the slits 49 and pushes the button 46 inwardly—that is from left to right as viewed in FIG. 2. The button 46 slides along the length of the slot 31; and when it reaches the ramp portion 38 of the spring 33, it depresses the spring from the solid line position to the dot-and-dash position of FIG. 2. In such position, the foot 41 enages the rim 24 or at least applies pressure to the rim through the shield 26 and prevents rotation of the reel 23. Latch 46 tends to remain in the dot-and-dash position of FIG. 2 by reason of the resilient nature of spring 33 and the angle of ramp 38. When it is necessary to unlatch the reel, button 46 is returned to solid line position. If, through negligence, the casette 21 should be installed in a machine, although there is a frictional engagement of foot 41 with shield 26, and although this frictional engagement is sufficient to prevent unintentional unwinding of tape 27, the foot 41 will slip on the shield 26 and permit the tape 27 to unwind under power drive of the reel 26 and hence prevent damage to the machine or tearing of the tape.

Figure 4:
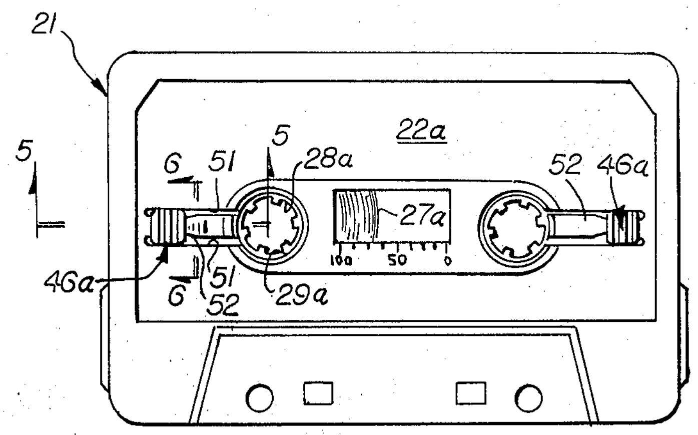
FIG. 4 is a view similar to FIG. 1 of a modification.
Figure 5:
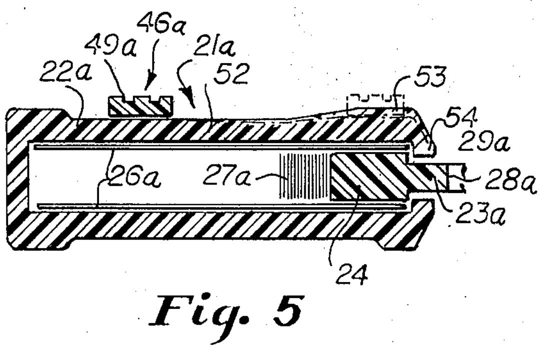
FIGS. 5 and 6 are respectively views similar to FIGS. 2 and 3 of the modification of FIG. 4.
Figure 6:
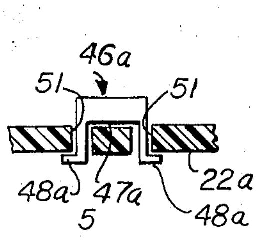

FIGS. 4–6 show a modified construction. Since many of the structural details of the cassette 21a of FIG. 4 are similar to those of FIG. 1, the same reference numerals followed by the subscript *a* are used to designate corresponding parts. In the modification of FIG. 4, there are two parallel narrow slots 51 separated by a middle portion 52. The inner end of middle portion 52 is thickened in an upward expanding ramp portion 53, and the inner end of middle portion 52 is formed in a downward extending tongue 54 which, when the latch is engaged, engages the reel 23*a*.

The latch button 46*a* fits over the middle portion 52 and its feet 48*a* extend under the margins of cover 22*a* outwardly of slots 51.

In the use of the latch 56*a*, with the use of finger slits 49*a*, the user slides the latch button 46*a* from the solid position of FIG. 5 to the dotted line position. As the button climbs the ramp 53, by reason of the fact that the feet 48*a* are captured under the cover 22*a* the ramp portion 53 is depressed and the tongue 54 tightly engages the reel 23*a*, preventing its rotation. The resiliency of the cover 22*a* (which is unsupported by most of its width and length) keeps the tongue 54 in tight engagement with the reel 23*a*. Such tight engagement is not so great, however, as to cause damage to the machine or to the tape 27*a* if the cassette 21*a* is unintentionally installed in a recording or transcribing machine. When it is desired to unlatch the cassette 21*a*, the user simply pushes the latch button 46*a* back to the solid line position and the resilient nature of the middle portion 52 restores the device to its original solid line position of FIG. 5.

What is claimed is:

1. A casette having a cover, at least one reel in said cover, tape wound around said reel, means rotatably mounting said reel inside said casette, said cover formed with a slot extending to an inward terminus over said reel and an outer terminus adjacent an outer edge of said cover, a latch button at least partially within said slot, first means on said button engaging the underside of said cover to retain said latch button on said cover but permit said button to slide longitudinally of said slot, and second means on said cover having a ramp on its inner end engaged by said latch button to depress said second means when said latch button nears the inward terminus of said slot, said second means when depressed frictionally engaging said reel to restrain turning of said reel, said reel being free to turn in said casette when frictional engagement of said second means is overcome to prevent damage to said tape.

2. A casette according to claim 1 in which said second means is resilient and is biased toward a position out of engagement with said reel and said latch button is held by friction in latched position.

3. A casette according to claim 2 in which said second means comprises a wire held in said cover and extending lengthwise of said slot.

4. A casette according to claim 3 in which said wire is bent to form said ramp slanted away from said reel, said button formed with a groove in which said wire is received.

5. A casette according to claim 1 in which said cover is formed with a second slot parallel to said first-mentioned slot, the cover material between said slots comprising said second means, said button formed with a groove on its underside receiving said second means, said first means comprising legs extending through said slots and having outward extending feet at their inner ends sliding under said cover outward of said slots.

6. A casette according to claim 5 in which said second means is thickened to form said ramp at its inner end.

* * * * *